(12) United States Patent
Krause et al.

(10) Patent No.: US 8,719,393 B2
(45) Date of Patent: May 6, 2014

(54) SELECTION OF SENSORS FOR MONITORING PHENOMENA CONSIDERING THE VALUE OF INFORMATION AND DATA SHARING PREFERENCES

(75) Inventors: Rainer Andreas Krause, Pittsburgh, PA (US); Eric Horvitz, Kirkland, WA (US); Aman Kansal, Issaquah, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 12/881,705

(22) Filed: Sep. 14, 2010

(65) Prior Publication Data

US 2011/0003583 A1    Jan. 6, 2011

Related U.S. Application Data

(63) Continuation of application No. 12/147,551, filed on Jun. 27, 2008, now Pat. No. 7,818,412.

(51) Int. Cl.
*G06F 15/16*    (2006.01)
*G06F 12/00*    (2006.01)

(52) U.S. Cl.
USPC ........................................................ 709/223

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 5,402,117 A | 3/1995 | Zijderhand | |
| 6,236,933 B1 | 5/2001 | Lang | |
| 6,791,580 B1 | 9/2004 | Abbott et al. | |
| 6,812,937 B1 | 11/2004 | Abbott et al. | |
| 7,073,129 B1 | 7/2006 | Robarts et al. | |
| 7,818,412 B2 * | 10/2010 | Krause et al. | 709/223 |
| 2002/0072963 A1 | 6/2002 | Jonge | |
| 2003/0212660 A1 * | 11/2003 | Kerwin | 707/1 |
| 2004/0267410 A1 | 12/2004 | Duri et al. | |
| 2005/0003804 A1 | 1/2005 | Huomo et al. | |
| 2005/0079878 A1 | 4/2005 | Smith et al. | |
| 2005/0154687 A1 * | 7/2005 | Kraiss | 706/12 |
| 2006/0026682 A1 | 2/2006 | Zakas | |
| 2006/0111833 A1 | 5/2006 | Feldman et al. | |
| 2006/0206613 A1 * | 9/2006 | Narita | 709/227 |
| 2007/0022384 A1 | 1/2007 | Abbott et al. | |
| 2007/0146167 A1 | 6/2007 | Miller et al. | |
| 2007/0189181 A1 | 8/2007 | Kirk et al. | |
| 2007/0208501 A1 | 9/2007 | Downs et al. | |

(Continued)

OTHER PUBLICATIONS

Hoh, et al., "Enhancing Security and Privacy in Traffic-Monitoring Systems", Published by the IEEE CS and IEEE ComSoc, Oct.-Dec. 2006, pp. 38-46.

(Continued)

*Primary Examiner* — Zarni Maung
(74) *Attorney, Agent, or Firm* — Dan Choi; Carole Boelitz; Micky Minhas

(57) ABSTRACT

A method disclosed herein includes the act of computing a value of information for obtaining data from a personal sensor of a user for utilization in a utilitarian computing application, wherein a mobile computing device comprises the personal sensor of the user. The method further includes the act of requesting that the mobile computing device transmit a data packet to the computing device based at least in part upon the value of information for obtaining data from the personal sensor of the user.

19 Claims, 12 Drawing Sheets

(56) References Cited

U.S. PATENT DOCUMENTS

| | | |
|---|---|---|
| 2007/0293958 A1 | 12/2007 | Stehle et al. |
| 2008/0002791 A1* | 1/2008 | Gratrix et al. ............ 375/341 |
| 2008/0146892 A1 | 6/2008 | LeBoeuf et al. |
| 2008/0195824 A1* | 8/2008 | Sadovsky et al. ......... 711/158 |

OTHER PUBLICATIONS

Gruteser, et al., "Path Privacy in Location-aware Computing", Proceedings of MobiSys 2004 Workshop on Context Awareness, 2004, 6 pages.

Fogarty, et al., "Anonymous and Privacy-Sensitive Collection of Sensed Data in Location-Based Applications", CHI 2006, Apr. 22-27, 2006, 3 pages.

Harrington, et al., "Route Profiling Puffing Context to Work", SAC'04, Mar. 14-17, 2004, 7 pages.

Chaloner, et al., "Bayesian experimental design: A review", Statistical Science, vol. 10, No. 3 (1995), 69 pages.

Cheng, et al., "Particle Filter Based Traffic State Estimation Using Cell Phone Network Data", Proceedings of the IEEE ITSC, Sep. 17-20, 2006, pp. 1047-1052.

Zhao, et al., "Information-Driven Dynamic Sensor Collaboration for Tracking Applications", IEEE Signal Processing Magazine, vol. 19, Mar. 2002, 9 pages.

Das, et al., "Algorithms for Subset Selection in Linear Regression", Extended abstract for STOC 2008, Nov. 19, 2007, 20 pages.

Yoon, et al., "Surface Street Traffic Estimation", MobiSys ' 07, Jun. 11-14, 2007, pp. 220-232.

Goldberg, et al., "Collaborative Teleoperation Using Networked Spatial Dynamic Voting", Proceedings of the IEEE, vol. 91, No. 3, Mar. 2003, pp. 430-439.

Guestrin, et al., "Near-Optimal Sensor Placements in Gaussian Processes", Proceedings of the 22nd International Conference on Machine Learning, 2005, 8 pages.

Horvitz, et al., "Prediction, Expectation, and Surprise: Methods, Designs, and Study of a Deployed Traffic Forecasting Service", Twenty-First Conference on Uncertainty in Artificial Intelligence, UAI-2005, Jul. 2005, 9 pages.

Kansal, et al., "SenseWeb: An Infrastructure for Shared Sensing", IEEE MultiMedia, vol. 14, No. 4, 2007, pp. 8-13.

Kondor, et al., "Diffusion Kernels on Graphs and Other Discrete Input Spaces", ICML, 2002, pp. 315-322.

Krause, et al., "Near-optimal Observation Selection using Submodular Functions", 2007, 5 pages.

Krause, et al., "Near-optimal Sensor Placements: Maximizing Information while Minimizing Communication Cost", IPSN'06, Apr. 19-21, 2006, 10 pages.

John Krumm, et al., "Inference Attacks on Location Tracks", Fifth International Conference on Pervasive Computing (Pervasive 2007), May 13-16, 2007, 18 pages.

Krumm, et al., "Predestination: Inferring Destinations from Partial Trajectories", The Eighth International Conference on Ubiquitous Computing, Sep. 17-21, 2006, 18 pages.

"California PATH Partners for Advanced Transit and Highways", Annual Report, 1998, 44 pages.

Leskovec, et al., "Cost-effective Outbreak Detection in Networks", KDD'07, Aug. 12-15, 2007, 10 pages.

David A. Lieb, "MoDOT tracking cell phone signals to monitor traffic speed, congestion", Sep. 23, 2007, 4 pages.

Meliou, et al., "Nonmyopic Informative Path Planning in Spatio-Temporal Models", Proceedings of 22nd Conference on Artificial Intelligence (AAAI) 2007, 11 pages.

Wunnava, et al., "Travel Time Estimation Using Cell Phones (TTECP) for Highways and Roadways", Jan. 29, 2007, 81 pages.

Olson, et al., "A Study of Preferences for Sharing and Privacy", CHI 2005; Apr. 2-7, 2005, 5 pages.

Rasmussen, et al., "Gaussian Processes for Machine Learning", the MIT Press, 2006, 18 pages.

Seo, et al., "Gaussian Process Regression: Active Data Selection and Test Point Rejection", 2000, 6 pages.

Singh, et al., "Efficient Planning of Informative Paths for Multiple Robots", IJCAI-07, 2007, pp. 2204-2211.

\* cited by examiner

SELECTION OF SENSORS FOR MONITORING PHENOMENA CONSIDERING THE VALUE OF INFORMATION AND DATA SHARING PREFERENCES

CROSS REFERENCE TO RELATED APPLICATIONS

This application is a continuation of U.S. patent application Ser. No. 12/147,551, filed on Jun. 27, 2008, and entitled "SELECTION OF SENSORS FOR MONITORING PHENOMENA CONSIDERING THE VALUE OF INFORMATION AND DATA SHARING PREFERENCES", the entirety of which is incorporated herein by reference.

BACKGROUND

Enhancements in data storage have enabled massive amounts of information to be collected, stored, and analyzed. For example, many search engines retain information regarding what search terms have been used, identities of websites visited by users, what time of day, day of week, and the like web sites have been visited by users, amongst other data. Furthermore, collected data is not limited to data collected from computers and the Internet. In the modern world, more and more sensors are being used by consumers, wherein such sensors can determine, for instance, a location of a user, a current temperature of a user, temperature experienced by a user (e.g., eighty degrees), direction of movement of a user, velocity, acceleration, and/or deceleration of a user, amongst other information.

Information collected from multiple sensors including those that may be privately held may then be pooled and used by applications whose outputs are context-dependent. Pursuant to a particular example, applications exist that provide users with driving directions (e.g., a route) between two or more points, wherein the route may depend on current sensed conditions with respect to flows within a traffic system, based on such data as sensed congestion, sensed weather conditions, sensed current events (e.g., accidents), and other data. In many of these traffic-related applications, data is retrieved from sensors placed proximate to roadways, wherein the sensors are relatively expensive to install and maintain.

While consumer-level sensors are becoming more common (e.g., in smart phones, navigation equipment, etc.), users may often be hesitant to share data from the sensors due to concerns regarding privacy, power consumption, annoyance, etc. For instance, with respect to an application that desirably monitors location and/or velocity of a user, if the user is monitored over time, data from the sensor may be analyzed to determine where the user lives, where the user works, where the user travels, favourite shopping malls, and other information that many users deem as private. Taken a step further, this information may be used to determine the user's identity as well as their home address, typical travel routes, etc. Fears about sharing such data include the concerns about being tracked and being the recipient of unwanted targeted marketing by commercial entities.

One method for reducing privacy concerns of a user may be to request authorization from the user each time data pertaining to the user (e.g., from a sensor that corresponds to the user) is desired by the application. These types of requests, however, may interrupt the user when they wish not to be interrupted (e.g., while driving). Furthermore, users may not wish to donate battery and networking resources, such as the cost of communicating with a wireless service, required for sensing and transmitting data.

SUMMARY

The following is a brief summary of subject matter that is described in greater detail herein. This summary is not intended to be limiting as to the scope of the claims.

Various technologies relating to provision of services to users while recognizing and enforcing user-defined preferences for sharing of data are described in detail herein. Some applications can use data corresponding to numerous individuals to update the application and/or output a result. Pursuant to an example, applications for depicting and/or predicting the flow of traffic through a traffic system can benefit from receipt of data from many users that are driving through the traffic system. For instance, a GPS sensor in an automobile can indicate a user's position, direction of travel, and/or velocity. This data, if provided to the application, can be used in a utilitarian manner to indicate current traffic conditions along routes that may be traveled by others, where the value of the shared data may be a function of both the value of the data for reducing uncertainty about one or more road segments and the frequency with which a population of drivers may wish to consider such road segments in trips. While traffic systems have been provided as an example, it is understood that applications relating to other systems/phenomenon also can collect data from individual users to better model current conditions in a system/phenomenon. For example, applications that depict/estimate lines at an airport, current weather conditions experienced by users at certain locations, data relating to news events, etc. can benefit from receipt of data from many users in a population.

As noted above, however, users (e.g., due to privacy concerns, power constraints, and the like) may be hesitant to share data without some measure of control over data that is shared. Accordingly, users can define data sharing preferences and such preferences can be respected/enforced by an application wishing to use the data. For example, a user may indicate that data can be requested from a sensor corresponding to the user a limited number of times per a threshold time period (e.g., four times a month). In another example, the sensor may have the ability to indicate a location of the user, and the user may not wish to have their locations sensed within a certain range of their home or work. Other preferences are also contemplated and are intended to fall under the scope of the hereto-appended claims.

In return for providing data that can be used by the application, for example, users may be provided with rights to use the application or portions thereof. For instance, if a user agrees to provide a certain amount of data with respect to a traffic-related application, then the user may be provided with rights to use the traffic application.

Pursuant to an example, a model of a phenomenon can be generated based at least in part upon collected data. For instance, the phenomenon may be a traffic system and traffic flows therein, a weather system and weather changes therein, or other suitable phenomenon. The model of the phenomenon can be analyzed to determine, given different contexts, where data can be received to reduce uncertainty where it is desirable to reduce uncertainty. For example, determining a velocity of traffic on a first roadway in a traffic system may reduce uncertainty of traffic flow at a second roadway in the traffic system, wherein the second roadway is one that is frequently traveled by users of a traffic-related application. Using information related to demand and portions of the phenomenon where uncertainty can be reduced, a demand-weighted value of information for receiving data pertaining to certain portions of a model of a phenomenon can be ascertained.

Data may then be acquired from sensors in accordance with the demand-weighted value of information while respecting preferences regarding sharing data that are defined by the user. For example, if a user has indicated that they do not wish to share data when they are in a certain geographic region, and data is requested from the user when they are in such region, then the data may not be used, analyzed, or retained. In another example, a user may indicate that data should not be requested from them more than three times in a month. If data is requested from the user, then a number of times that data can be requested in the future is reduced. Mechanisms for determining when to request data from users are described in detail herein.

Other aspects will be appreciated upon reading and understanding the attached figures and description.

DETAILED DESCRIPTION

Figure 1:
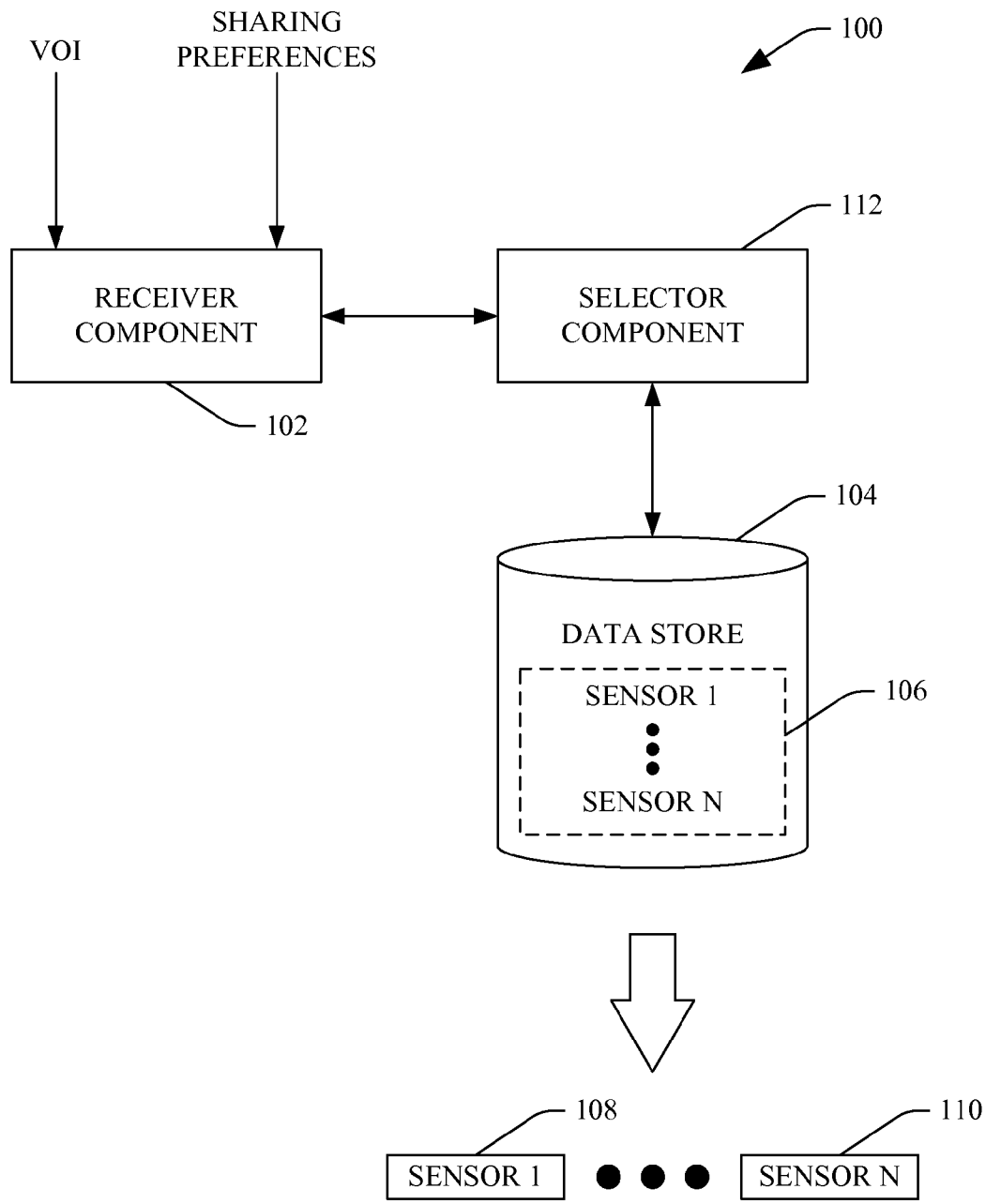
FIG. 1 is a functional block diagram of an exemplary system that facilitates selection of a sensor from amongst multiple sensors based at least in part upon user-defined preferences for sharing data.

Various technologies pertaining to requesting data from users while respecting user-defined preferences for sharing data will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an exemplary system 100 that facilitates selection of one or more sensors while respecting data preferences as defined by users is illustrated. The system 100 includes a receiver component 102 that receives a value of information (VOI) for receiving data that corresponds to a particular portion of a model of a phenomenon, such as a traffic system, weather system, or other suitable phenomenon. The receiver component 102 also receives preferences for sharing of data from the sensor as defined by a user that corresponds to the sensor. In an example, the VOI may be based at least in part upon an amount that uncertainty can be reduced with respect to a portion or segment of a model by obtaining data from a sensor that corresponds to the portion or segment of the model. The VOI may also be demand-weighted, wherein the portion or segment of the model is of high demand for a significant portion of a population. For instance, in an example related to a traffic system, the VOI may indicate that collection of data that corresponds to a particular portion of a model of the traffic system can reduce uncertainty with respect to a high-demand (e.g., high traffic) segment of a roadway. Determination of VOI with respect to particular segments or portions of a model of a phenomenon, such as a traffic system, weather system, or the like is described in greater detail infra.

The preferences for sharing data can be explicitly defined by a user. In another example related to traffic, a user may not wish to provide data from a sensor when the user is within a certain radial distance from their home. In other words, the preferences for sharing data may include constraints on requesting data when a sensor corresponding to the user is in a geographic area defined by the user. In another example, the user may wish to allow data to be provided from a sensor that corresponds to the user (e.g., a GPS sensor in a portable telephone) a limited number of times over a defined time period. For instance, the user may allow data to be used from a sensor that corresponds to the user three times a month. In yet another example, the user may allow data to be used from a GPS sensor when a particular rate of deceleration is detected (e.g., brakes on a car are slammed). In still yet another example, the user may define one or more windows of time that data can be requested from a sensor that corresponds to the user. In yet another example, the user may desire to share data when data values output by a sensor are above a threshold or below a threshold (e.g., when a threshold amount of deceleration is detected). Still further, the user preferences may be some combination of the aforementioned preferences or other preferences. Pursuant to an example, in return for allowing data from a sensor to be used, the user may be provided with compensation, access to services that may be restricted to users that do not provide data, etc.

The system 100 also includes a data store 104 that includes a list of sensors 106 that correspond to users that allow data from such sensors to be employed. Sensors in the list of sensors 106 correspond to sensors 108-110 that exist in the "real world", such as GPS sensors, temperature sensors, acceleration sensors, velocity sensors, barometric pressure sensors, or any other suitable sensors where owners thereof have authorized, with or without defined restrictions, use of data from the sensors 108-110.

A selector component 112 selects one or more sensors from the list of sensors 106 from which to request data based at least in part upon the VOI and the sharing preferences received by the receiver component 102. For example, the selector component 112 can receive the VOI which may indicate that receiving data that corresponds to a certain portion of a model of a phenomenon, such as a traffic system, is highly desirable. The selector component 112 may analyze sensors in the list of sensors 106 and determine, for instance, which of the sensors in the "real world" (e.g., the sensors 108-110) is, at that particular time, likely to correspond to the portion of the model that is associated with the VOI. Data may thereafter be requested from the selected sensor.

In another example, the selector component 112 may randomly select a sensor from the list of sensors 106. In still yet another example, the selector component 112 may have some information relating to one or more sensors and may select a sensor based upon such information. For instance, in a traffic-related example, the selector component 112 may have knowledge of a particular geographic region (e.g., a cell in a cellular network) where one or more of the sensors 108-110 currently reside, but may not have knowledge of a precise location of the one or more of the sensors 108-110. The selector component 112 can select one or more of the sensors 108-110 based at least in part upon such partial information, and data can be requested from the selected sensor(s). Selection of one or more sensors from a plurality of sensors is described in greater detail below.

In another example, the selector component 112 can select a sensor from the list of sensors 105 based at least in part upon data actively provided by the sensor to the selector component 112. For instance, a sensor may indicate that deceleration above a threshold amount has been detected, and can inform the selector component 112 that such sensor is desirably selected by the selector component 112. For instance, the sensor may push data to the selector component 112.

Figure 2:
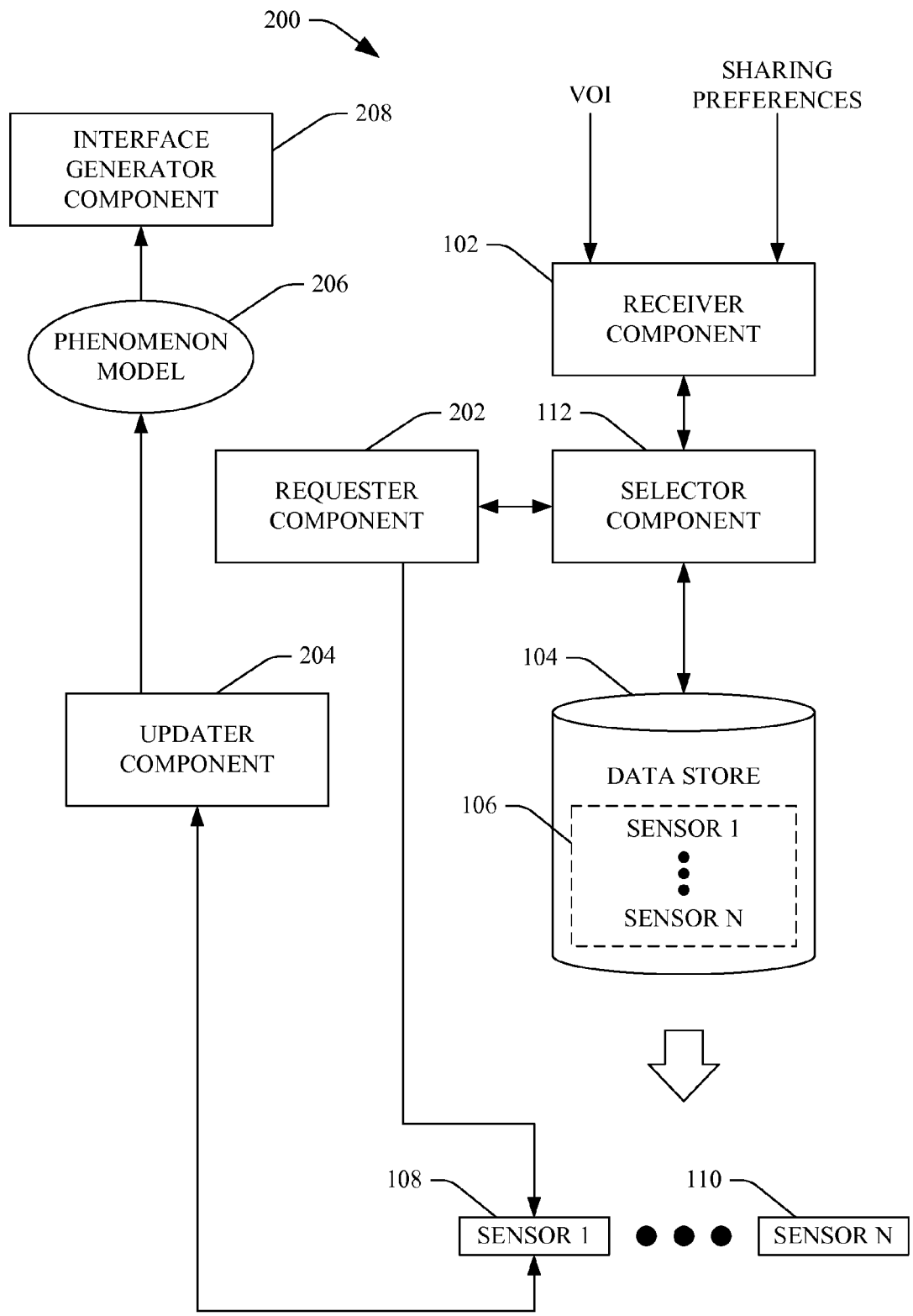
FIG. 2 is a functional block diagram of an exemplary system that facilitates updating a model of a phenomenon.

Referring now to FIG. 2, an example system 200 that facilitates requesting and using data from sensors while respecting user-defined preferences for sharing data from the sensors is illustrated. The system 200 includes the receiver component 102, the data store 104 that includes the list of sensors 106, the sensors 108-110, and the selector component 112, which operate as described above. The system 200 also includes a requester component 202 that can be in communication with a subset of the one or more sensors 108-110. With more specificity, the selector component 112 can select at least one sensor from the list of sensors 106 based at least in part upon the VOI and the preferences for sharing received by the receiver component 102. The selector component 112 may provide the requester component 202 with information regarding which of the sensors has been selected. In response to information output by the selector component 112, the requester component 202 may request data from one or more selected sensors by, for instance, pinging a selected sensor or sensors for data. In the example depicted with respect to FIG. 2, the selector component 112 selects a sensor in the list of sensors 106 that corresponds to the first sensor 108. The requester component 202 receives an indication of such selection, and the requester component 202 pings the first sensor 108 for data.

The system 200 further includes an updater component 204 that receives data from sensors pinged by the requester component 202. The updater component 204 updates a phenomenon model 206, such as a model of a traffic system, a weather system, news events, or other suitable phenomenon. In an example, the phenomenon model 206 may be a model of a traffic system, and data received by the updater component 204 can indicate a location, direction of travel, velocity, and/or acceleration/deceleration of a traveler on a particular roadway in a traffic system. The updater component 204 can update the phenomenon model 206 with the data received from the sensor 108. For instance, the updater component 204 can update a portion of the phenomenon model 206 that corresponds to location of the selected first sensor 108, as well as portions of the phenomenon model 206 that can be affected by portion corresponding to the sensor. For instance, data that indicates a traffic jam on a certain road segment may also be indicative of a traffic jam on another road segment, wherein the road segments may be portions of a roadway or different roadways.

The system 200 can further include an interface generator component 208 that can output current conditions and/or predicted conditions of a phenomenon modeled by the phenomenon model 206, wherein the current conditions and/or predicted conditions are based at least in part upon updates to the phenomenon model 206 made by the updater component 204. The output by the interface generator component 208 may be graphical in nature and can be directed towards a display screen, such as a display screen of a computer, a personal digital assistant (PDA), a portable telephone, and/or the like. The output by the interface generator component 208 can also be stored in a computer-readable medium. In a particular example, the interface generator component 208 can output a route between two geographic locations as requested by a user, wherein the route depends on data received from the one or more sensors 108-110, time of day, day of week, and other contextual data. The output may be in the form of a map and/or printed directions between the two geographic locations.

Figure 3:
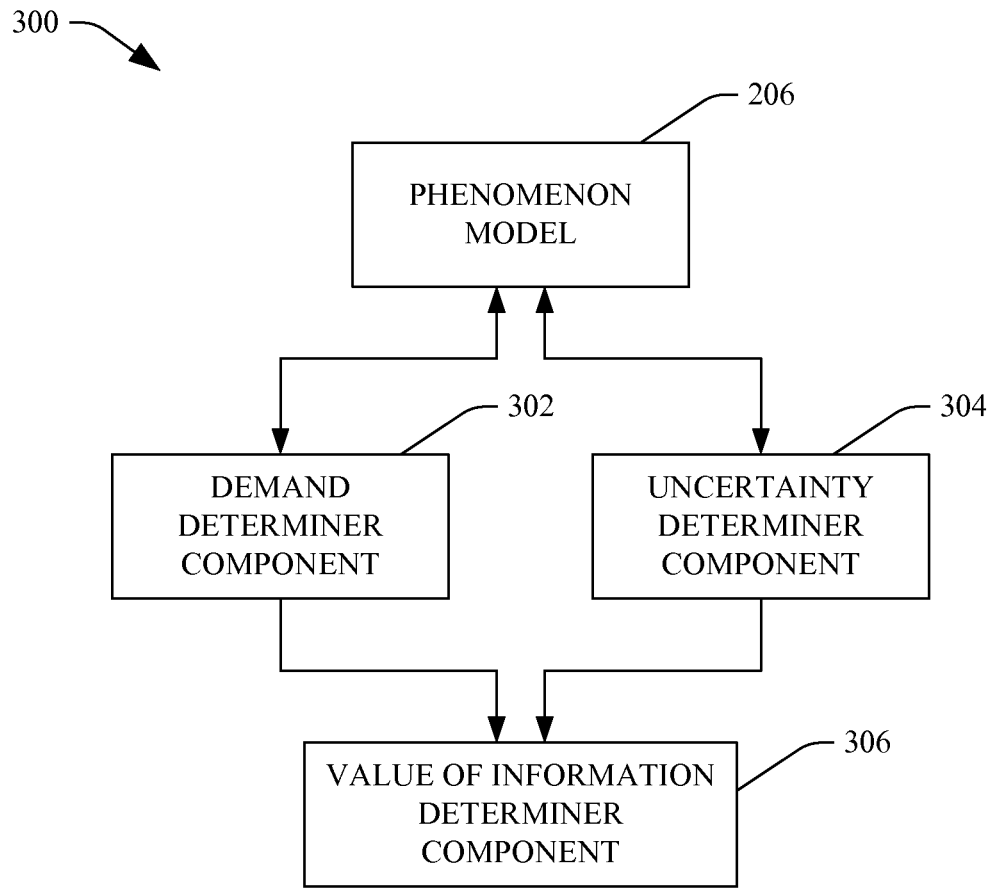
FIG. 3 is a functional block diagram of an exemplary system that facilitates determining a value of information for a portion of a model of a phenomenon.

Now referring to FIG. 3, an example system 300 that facilitates determining a value of information with respect to obtaining data that corresponds to a particular portion of a phenomenon model is illustrated. The system 300 includes the phenomenon model 206 that, for purposes of explanation, is described as being a model of a traffic system. It is to be understood, however, that the phenomenon model 206 can model any suitable phenomenon, including waiting lines at an airport, bank, waiting lines at amusement parks, news events, weather systems, at least a portion of the stock market, or any other suitable model that, for instance, can model human behavior. An example phenomenon model that can be used in connection with aspects described herein is described in United States Patent Application No. 2008/0004794, entitled "Computation of Travel Routes, Durations, and Plans Over Multiple Contexts", and filed on Jun. 30, 2006, the entirety of which is incorporated herein by reference.

The system 300 further includes a demand determiner component 302 that determines a demand that corresponds to one or more segments of the phenomenon model 206, and thus corresponds to one or more segments of the phenomenon itself. For instance, a demand determined by the demand determiner component 302 may be utilitarian in nature, such that it can be used to indicate segments of a phenomenon (modeled by the phenomenon model 206) that are of interest to a significant portion of a population.

An uncertainty determiner component 304 that determines an amount that uncertainty can be reduced in at least one portion of the phenomenon model 206 if data is received with respect to a certain portion of the phenomenon model 206. Determination of amounts uncertainty can be reduced is described in greater detail below.

A value of information determiner component 306 determines a value of information for receiving data with respect to a particular portion of the phenomenon model 206 based at least in part upon the demand determined by the demand determiner component 304 and the amount that uncertainty can be reduced as determined by the uncertainty determiner component 304.

With more detail regarding to the phenomenon model 206, such phenomenon model 206 can be generated by collecting data over time related to the phenomenon that is to be modeled. For instance, data can be collected from sensors over time, and the collected data may then be used by a learning process to create a model of a phenomenon. In a particular example, volunteers may willingly share data with respect to their location, velocity, etc. while they are operating an automobile. Such data can be collected from several volunteers over time, and the data can be used to create a context-sensitive model of a traffic system. Still further, the phenomenon model 206 can be analyzed to determine which portions/segments of the model are interrelated. In an example, in a "real-world" traffic system setting, a traffic jam at a first road segment may typically correspond to a certain traffic flow at a second road segment. Accordingly, receiving data from a sensor at the first road segment may reduce uncertainty with respect to traffic flows at the second segment (and possibly other segments of the modeled traffic system).

Pursuant to a detailed example, the phenomenon model 206 may model a spatiotemporal phenomenon/system and can be created by way of a spatial stochastic process, with a random variable $X_s$ for each location $s \in V$, wherein a random variable may be associated with each location-time pair for a set of time points. If a suitable number of observed values $X_A = x_A$ are received, values with respect to a phenomenon can be predicted at locations where data has not been observed V/A, for instance, by using conditional expectations $\mathbb{E}[X_{V/A} | X_A = x_A]$. For $A' \subset V$, the notation $X_{A'}$ can be used to refer to the vector $(X_s)_{s \in A'}$, of random variables. In an example, as predictions are uncertain, the phenomenon model 206 can be used to predict variance at each spatial location $s \in V/A$ represented by the model 206, $$Var(X_s | X_A = x_A) = \mathbb{E}[(X_s - \mathbb{E}[X_s | X_A = x_A])^2 | X_A = x_A].$$

The uncertainty determiner component 304 can quantify a value of observations by using a reduction in the predicted variance, $$Var(X_s) - Var(X_s | X_A = x_A),$$

after $X_A = x_A$ has been observed. Based at least in part upon the phenomenon model 206, for instance, a set A of observations can be selected by the uncertainty determiner component 304 that maximally or substantially maximally reduce the variance at the unobserved locations.

The demand determiner component 302 can be used to determine where accuracy is most desirable. In a traffic example, the demand determiner component 302 can determine which road segments are most frequently traveled and/or are most frequently part of a route request (e.g., a request for driving directions between two points). In other words, the demand can correspond to an expected number of vehicles on a roadway segment at a defined point in time, thus capturing a utilitarian perspective on the contribution of sets of sensors to enhanced understanding of the target world phenomenon of interest (traffic flows in the example). In a specific example, a non-negative spatial process, $D_s$, can be defined over all locations $s \in V$.

Given the above, it can be discerned that the value of information determiner component 306 can determine a demand-weighted variance reduction (e.g., value of information). An example representation of the value of information is shown below:

$$R(A) = \Sigma_{s \in V} \mathbb{E}[D_s(Var(X_s | X_A))],$$

wherein the expected demand-weighted variance reduction can be taken with respect to observations $X_A = x_A$ and the demand $D_s = d_s$ (a set of observed data indicative of demand).

As described with respect to FIG. 1, the selector component 112 determines which of a plurality of sensors is to be pinged for data. When making decisions regarding pinging sensors, however, it may not be possible to obtain data from sensors that are at locations A directly, as sensors may not exist at such locations, user-defined preferences for sharing data may restrict access to data at certain locations and/or at certain times, etc. Accordingly, models of uncertainty in sensor availability can be learned and integrated in the systems described herein. For instance, the selector component 112 can include and/or access one or more models of uncertainty in sensor availability.

For sensor locations, it can be assumed that a set of W possible observations is available. Each observation, for example, may correspond to a person porting a/GPS system walking through a city, or a GPS-ready car travelling through a traffic system. Each observation $w \in W$ can correspond to a distribution over possible sensor locations, and any particular subset $B \subset W$, can induce a distribution $P(A|B)$ over subsets A. In addition, a model of sensor availability can incorporate a notion of selection noise.

Pursuant to a particular example, an informational objective that can be maximized or substantially maximized can be defined as follows:

$$F(B) = \mathbb{E}_A[R(A)],$$

which can represent an expected demand-weighted variance reduction, where the expected demand-weighted variance reduction can be taken over the set of observed locations A, the observations at locations $X_A = x_A$, and demands $D_V$ at all locations. The function F(B) can quantify the value of information of observations B.

In addition to considering demand uncertainty, the selector component 112 can also consider user-defined preferences for sharing data. For instance, the user-defined preferences may include constraints on privacy and/or resource usage. Resource usage can be modeled, for example, by associating a non-negative cost c(s) with each observation $s \in W$, and defining the following:

$$C(B) = \Sigma_{s \in B} c(s).$$

When each reading from a sensor is defined to have a unit cost (e.g., $c(s) = 1$), the cost $C(B) = |B|$ may be equal to a number of selected sensors. Such a cost model can be used to reduce or substantially minimize a number of collected readings over all sensors capable of being sensed in the phenomenon (e.g., a community of sensors). Other models may also be employed, wherein such models may model linear or nonlinear cost associated with increasing numbers of sensors, where costs depend on context such as location, time of day, weather conditions, and/or the like.

In a particular example, the phenomenon model 106 may be a model of a traffic system, wherein the joint distribution of normalized road speeds $X_s$ (e.g., speeds at which automobiles travel along road segments) for all locations $s \in V$ can be modeled using a Gaussian Process defined over a traffic system. The phenomenon model 106 may be specified by a mean function $M(s)$ and a covariance function $K(s, t)$. Pursuant to an example, for each set $A = \{s_1, \ldots, s_n\} \subset V$ of locations, the Gaussian Process can induce a multivariate normal distribution $X_A \sim N(\mu_A; \Sigma_{AA})$, where $\mu_A$ is a prior mean vector $\mu_A = (M(s_1), \ldots, M(s_n))$, and $\Sigma_{AA} = (K(s_i, s_j))_{i,j}$ is a prior covariance matrix, which may be obtained by evaluating a kernel function at all pairs of points.

Based on this described phenomenon model, variance reduction can be evaluated in closed form by the uncertainty determiner component 304:

$$Var(X_s) - Var(X_s | X_A = x_A) = \Sigma_{sA} \Sigma_{AA}^{-1} \Sigma_{As},$$

where $\Sigma_{sA} = (K(s, s_1), \ldots, K(s, s_n))$ is a vector of cross-correlations between $X_s$ and $X_A$.

Continuing with the traffic system example, for each road segment s ∈ V, demand $D_s$ can be defined as a number of cars traveling over each road segment. The demand can be modeled, for instance, using a Poisson random variable with mean $\lambda_s$. While, in practice, a demand model and phenomenon model may be correlated, for purposes of explanation independence can be assumed. Accordingly:

$$R(A) = \sum_{s \in V} \mathbb{E}[D_s] \mathbb{E}[(\text{Var}(X_s) - \text{Var}(X_s \mid X_A))]$$
$$= \sum_{s \in V} \lambda_s \Sigma_{sA} \Sigma_{AA}^{-1} \Sigma_{As},$$

which, for example, can be computed in closed form. It can be shown that R(A) is non-decreasing in A. For instance, for A ⊂ A' ⊂ V, it holds that R(A)≤R(A')≤R(V). Accordingly, R($\overline{A}$) can be normalized to between 0 and 1 by dividing by R(V).

In addition, for each observation b ∈ B, its availability distribution can be modeled as multinomial. Two examples for availability distributions are provided below. The example availability models are sensitive to user preferences regarding sharing of data, as such examples avoid constant monitoring of all sensor locations. In both example models, a selection noise distribution P(A|B) of road segments A given observations B.

While the above examples allude to components of the system 300 residing at a central location, it is to be understood that one or more of the components (and the phenomenon model 206) may reside on a client device, such as a portable telephone. In an example, the value of information determiner component 306 can execute on a client device, wherein the device has can make a decision regarding sharing sensor data given particular environmental parameters. For instance, information can be broadcast to the device (and other devices) regarding data needs pertaining to the phenomenon model 206 (such as location where uncertainty is desirably reduced). In another example, information can be static or cached regarding where uncertainty is desirably reduced at certain points in time. The device can be aware of certain environmental parameters, such as current location of the device, current time of day, etc., and the value of information determiner component 306 can use such information to determine a value of information of sharing sensed data. Thus, in an example, a device may be aware of its location and can have a shared sense of a VOI pertaining to the device as well as budge/constraints relating to sharing data. The device may then push data to a central location based at least in part upon a locally determined VOI with respect to sharing sensed data. In yet another example, a system may use some combination of centrally determined VOI and locally determined VOI.

Figure 4:
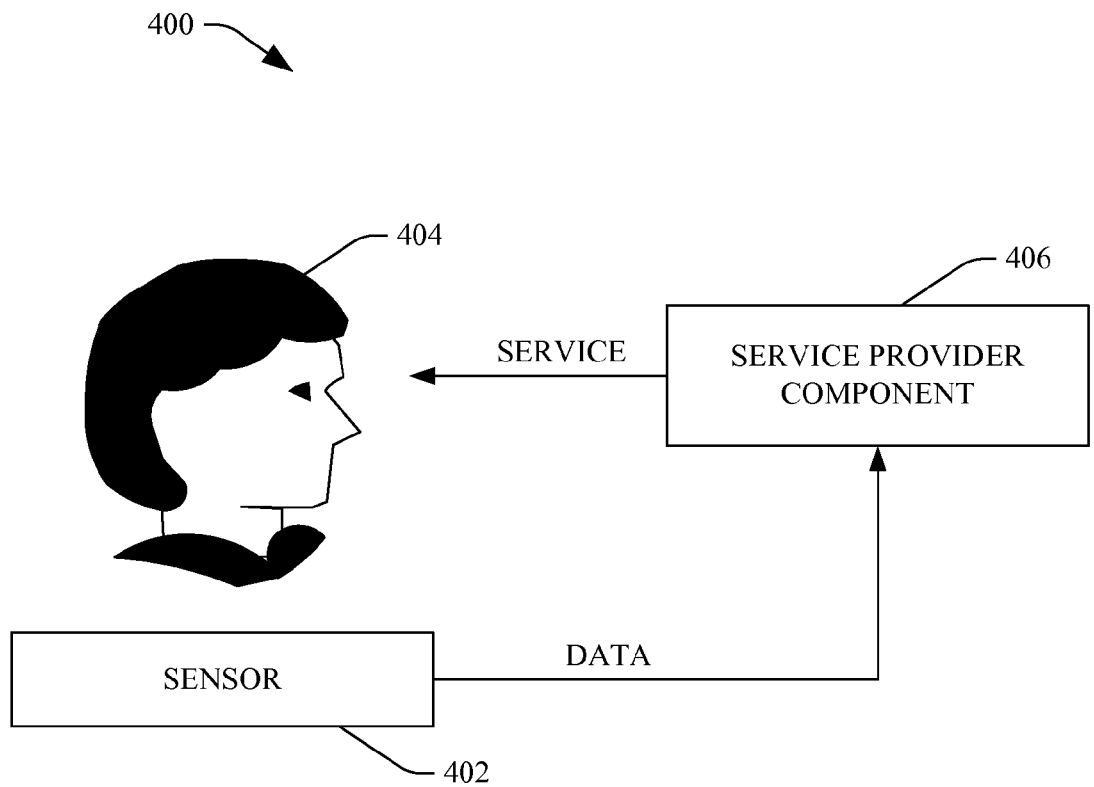
FIG. 4 is a functional block diagram of an exemplary system that facilitates providing services to a user in response to the user sharing data with a service.

Now referring to FIG. 4, an example system 400 that facilitates provision of services in exchange for data from a sensor is illustrated. The system 400 includes a sensor 402 that corresponds to a user 404, wherein data from such sensor may be desired to reduce uncertainty in a model of a system that can be used by several users. Thus, provision of data can serve utilitarian purposes. Pursuant to an example, the sensor 402 may be a GPS sensor, a temperature sensor, a pressure sensor, or any other suitable sensor.

The system 400 also includes a service provider component 406 that can provide a service to the user 404 in return for the user agreeing to provide data to the service provider component 406. For instance, a first service may be provided by the service provider component 406 to the user 404 if the user 404 agrees to provide a first amount and/or type of data.

A second service may be provided by the service provider component 406 to the user 404 if the user 404 agrees to provide a second amount and/or type of data. Accordingly, the service provider component 406 can create a contract with the user 404 with respect to what services are provided to the user and what the user 404 agrees to provide in return for the services.

Figure 5:
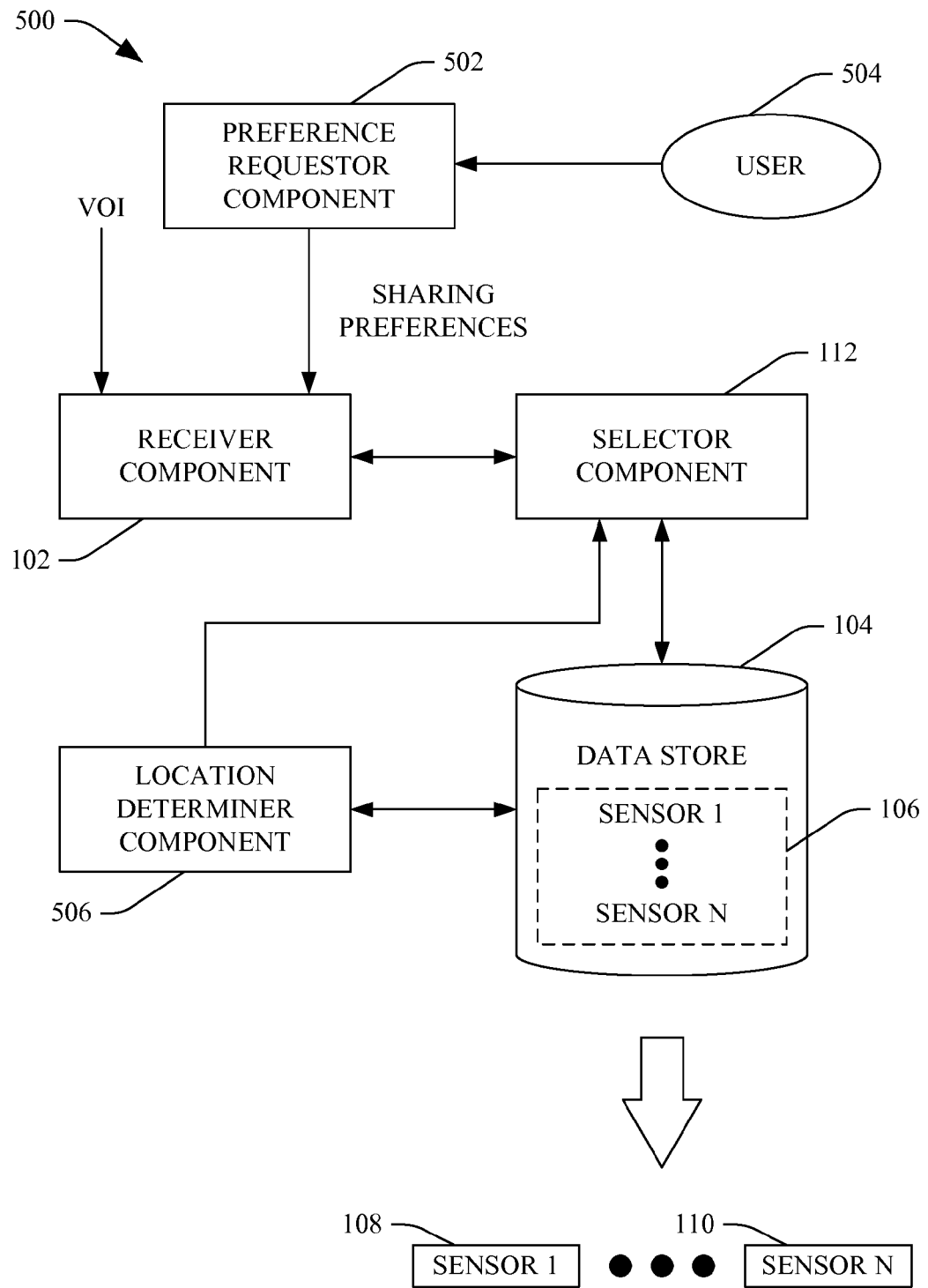
FIG. 5 is a functional block diagram of an exemplary system that facilitates selecting a sensor to query from amongst a plurality of sensors based at least in part upon user-defined preferences for sharing data.

Referring now to FIG. 5, an example system 500 that facilitates selecting one or more sensors amongst a plurality of sensors is illustrated. The system 500 includes a preference requestor component 502 that can request preferences regarding sharing data from a user 504. More specifically, the user 504 may have one or more sensors corresponding thereto, and the user 504 may specify, for instance, certain limitations with respect to sharing data from the sensor (e.g., only share data during certain times, only share data at certain locations, . . . ).

As described above, the receiver component 102 can receive the preferences regarding sharing as well as a value of information, and such information can be provided to the selector component 112. The value of information can be ascertained as described above.

The system 500 further includes a location determiner component 506 that can analyze available sensors in the list of sensors 106 and determine, with a particular probability, a location of each of the sensors 106. The location determiner component 506 may include or use, for instance, one or more models to predict a location of each of the sensors. A first example model that can be used by the location determiner component 506 can be described as being a spatial obfuscation approach. In such an approach, in a traffic example, space can be divided into a set of cells and only a region where information is desired is selected. Thus, the location determiner component 506 can determine a region where a sensor resides. The selector component 112, using the received value of information with respect to a particular segment of a phenomenon model, can select a sensor in a particular region according to a probability distribution defined over all sensors of the cell. Once selected, the sensor can reveal an exact location as well as measurements, but, for instance, may not reveal identifying information.

Another example model that can be included in or used by the location determiner component 506 can be described as being a sparse querying approach. In a traffic example, a pool of drivers may volunteer to participate, and instead of constantly monitoring each driver, sensors corresponding to the drivers can be sparsely and infrequently queried. In such a model, a location of a car is not initially known when it is queried. Once queried, the sensor can provide its location along with its measured road speed. Based at least in part upon previous queries and provided location information, for each driver a time-dependent availability distribution can be estimated. The selector component 112 can use the distribution to inform the decision of which cars (sensors) are desirably queried.

With reference now to FIGS. 6-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. Further, it is to be understood that at least some of the acts may be supplemented by functionality, acts, and/or features described above.

Figure 6:
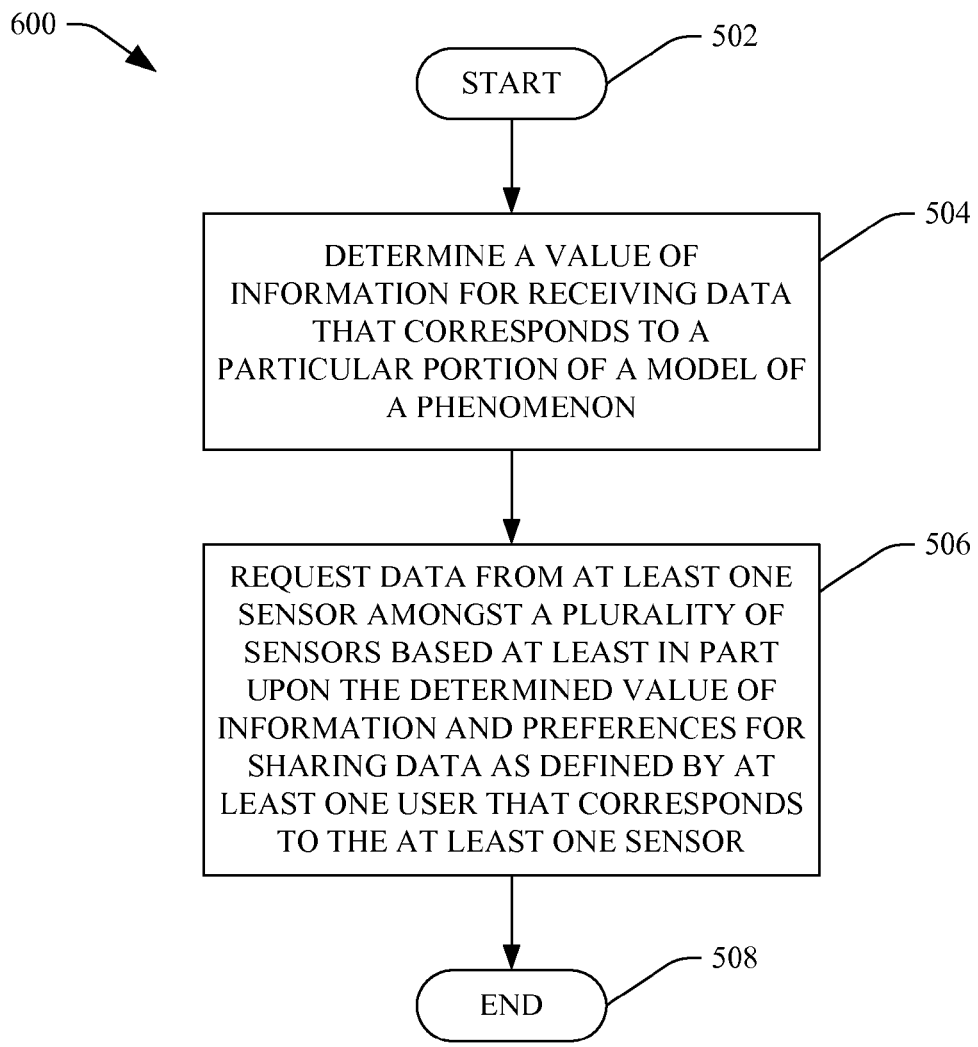
FIG. 6 is flow diagram that illustrates an exemplary methodology for requesting data from a sensor.

Referring specifically to FIG. 6, an example methodology 600 that facilitates requesting data from a sensor is illustrated. The methodology 600 starts at 602, and at 604 a value of information for receiving data with respect to a particular segment of a model of a phenomenon is determined. In a traffic example, a value of information for the segment of the model of the phenomenon may correspond to a segment of a roadway. The value of information may reflect, for instance, a particular amount that uncertainty can be reduced with respect to the portion of the model as well as a demand corresponding to the portion of the model.

At 606, data is requested from at least one sensor amongst a plurality of sensors based at least in part upon the determined value of information and preferences for sharing data as defined by a user that corresponds to the sensor. For instance, the sensor can be selected from amongst the plurality of sensors based upon a probability that the sensor corresponds to a segment of the phenomenon that is associated with the determined value of information. For instance, in a traffic example, the sensor can be selected based at least in part upon a probability that the sensor is travelling on a particular road segment, and further based upon preferences for sharing data. In other words, data from the sensor may not be used if a request for data violates user-defined preferences regarding sharing data. The methodology 600 ends at 608.

Figure 7:
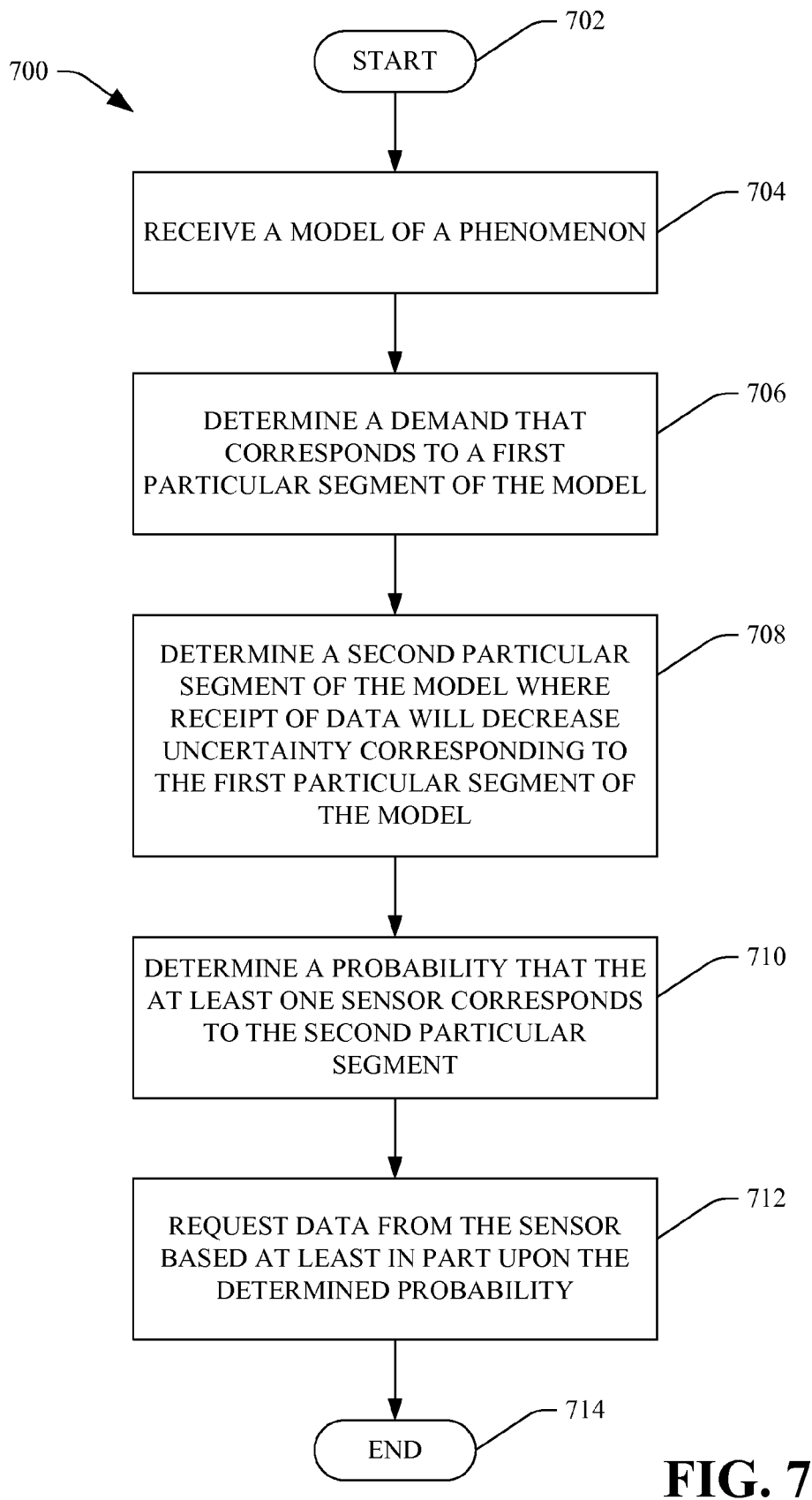
FIG. 7 is a flow diagram that illustrates an exemplary methodology for requesting data from a sensor.

Referring now to FIG. 7, an example methodology 700 for requesting data from a sensor is illustrated. The methodology 700 starts at 702, and at 704 a model of a phenomenon is received. The model may model any suitable phenomenon, such as a weather system, a traffic system, and/or the like.

At 706, a demand that corresponds to a first particular segment of the model is determined. In a traffic example, the demand can be indicative of a number of automobiles on a particular roadway segment that corresponds to the first particular segment of the model.

At 708, a second particular segment of the model where receipt of data will decrease uncertainty corresponding to the first particular segment of the model is determined. In an example, the first particular segment and the second particular segment may be a same segment. In another example, the first particular segment and the second particular segment may be different segments.

At 710, a probability that at least one sensor corresponds to the second particular segment is determined. In a traffic example, the probability may be a probability that a sensor is located on a roadway segment that corresponds to the second particular segment of the model.

At 712, data is requested from the sensor based at least in part upon the determined probability. The methodology 700 completes at 714.

Figure 8:
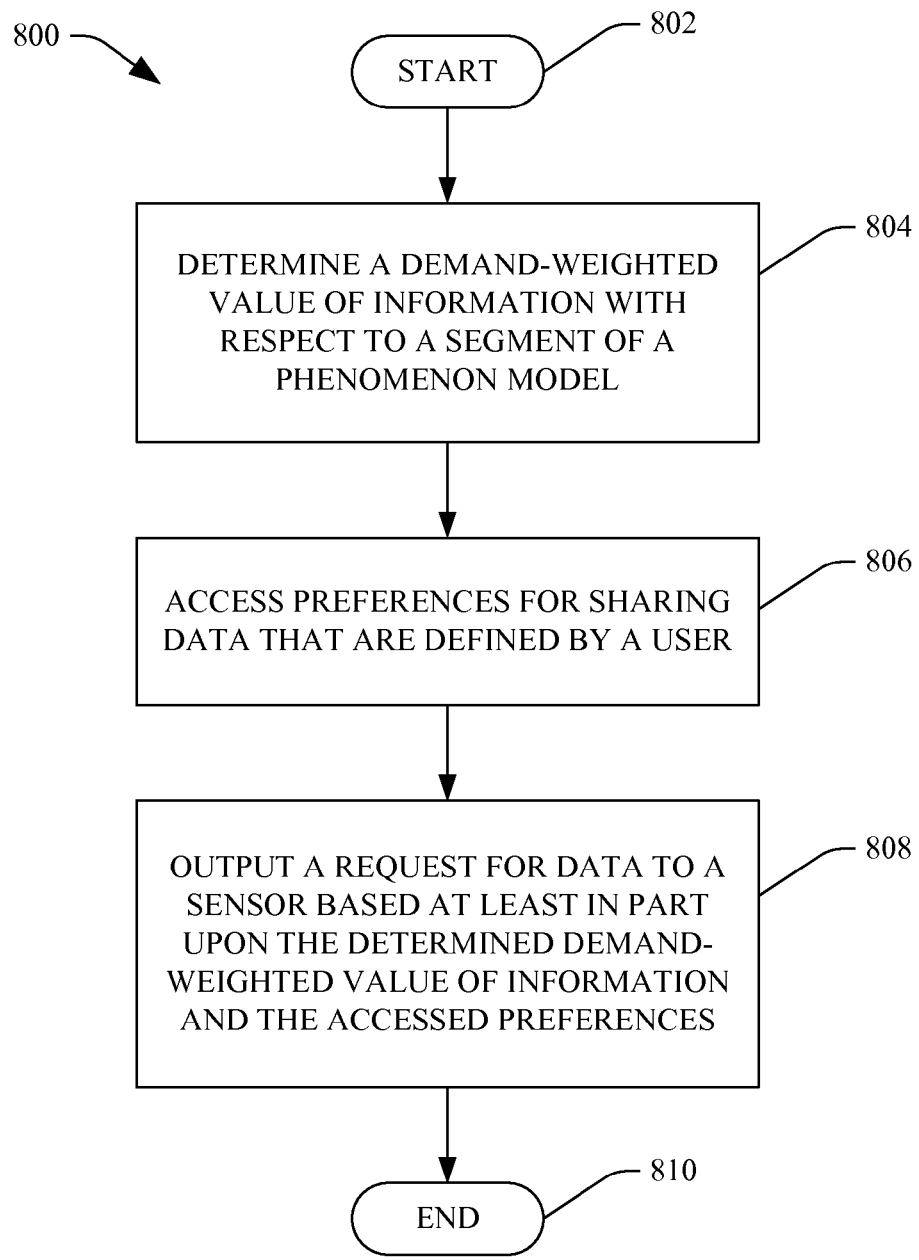
FIG. 8 is a flow diagram that illustrates an exemplary methodology for requesting data from a sensor.

With reference now to FIG. 8, an example methodology 800 for requesting data from a sensor is illustrated. The methodology 800 starts at 802, and at 804 a demand-weighted value of information is determined with respect to a segment of a phenomenon model. At 804, preferences for sharing data as defined by a user are accessed. These preferences may include preferences on how often data can be shared, restricted locations, and other constraints/preferences. At 806, a request for data is output to the sensor based at least in part upon the determined demand-weighted value of information and the accessed preferences. The methodology 800 completes at 808.

Figure 9:
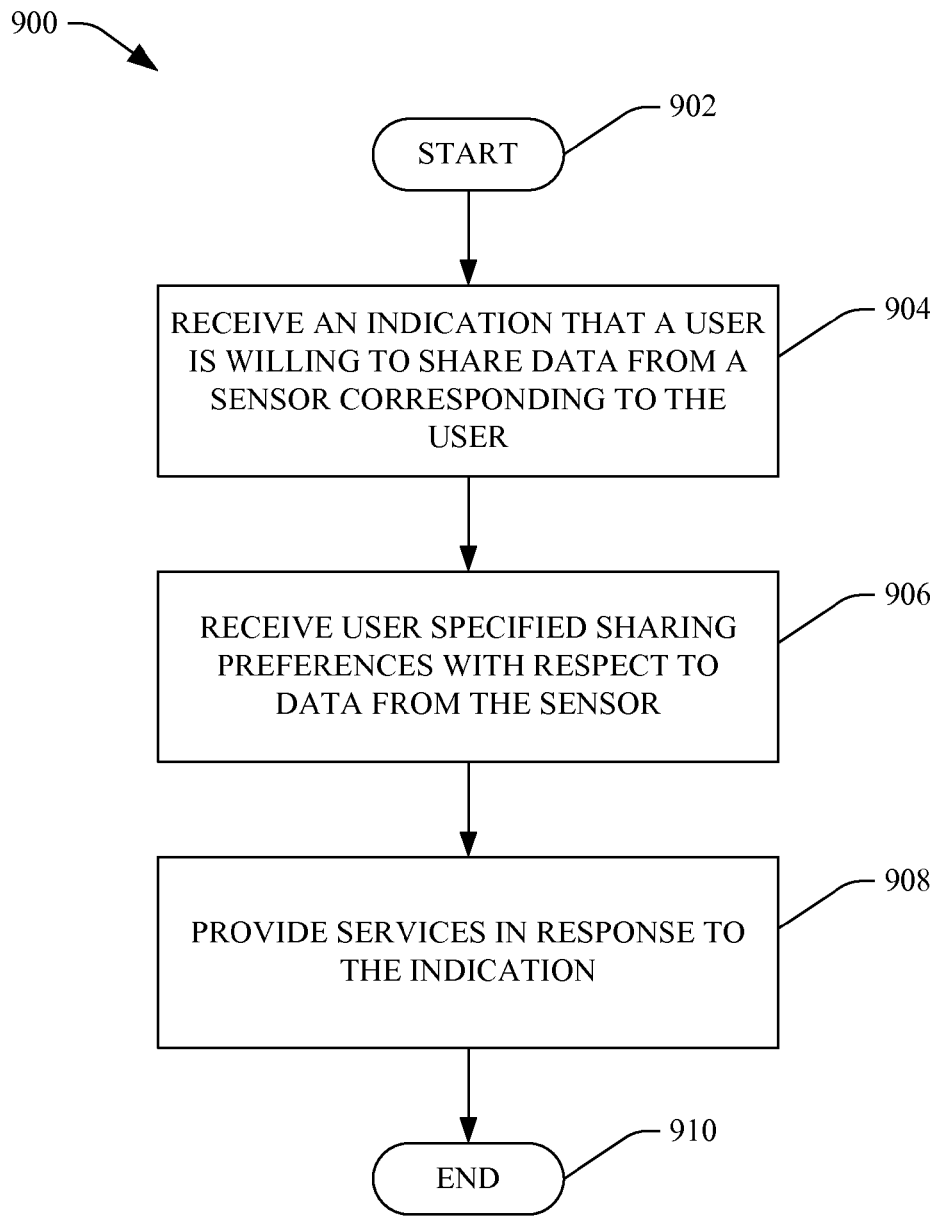
FIG. 9 is a flow diagram that illustrates an exemplary methodology for providing services to a user in exchange for receiving data from a sensor that corresponds to the user.

Now referring to FIG. 9, a methodology 900 for providing services to a user is illustrated. At 902, an indication is received that a user is willing to share data from a sensor that corresponds to the user. At 904, user specified sharing preferences with respect to data from the sensor are received. At 906, services are provided based at least in part upon the user specified sharing preferences. In a traffic example, the user may be willing to provide location and velocity data four times a month. For providing such data, the user can be provided with access to a traffic application that illustrates predicted/sensed flows over road segments. The methodology 900 completes at 908.

Figure 10:
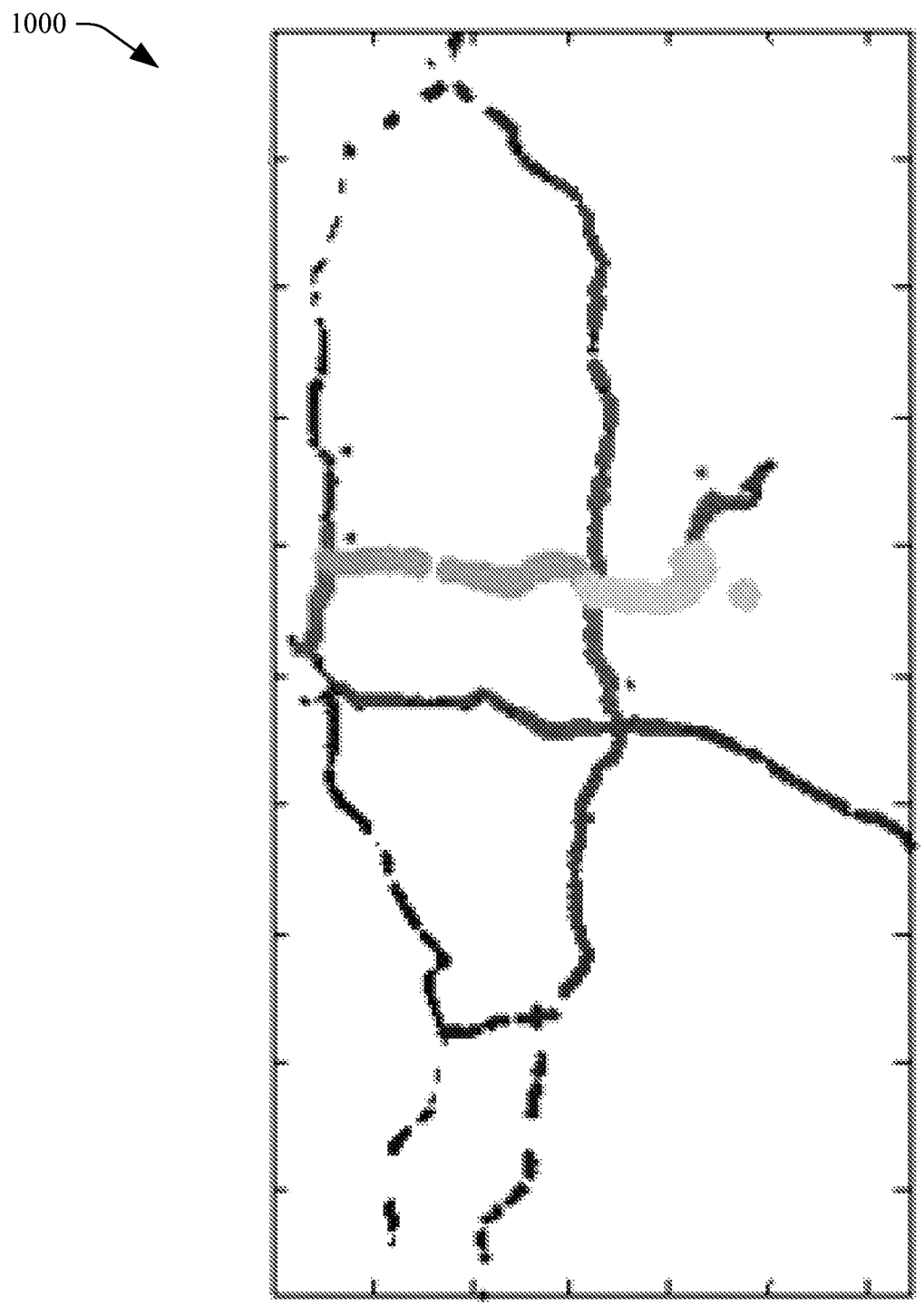
FIG. 10 is an exemplary graphical depiction of demand with respect to portions of a traffic system.

Turning now to FIG. 10, a graphical depiction of demand with respect to a traffic system is illustrated. Thicker lines indicate roadways that have a significant amount of demand. Thinner lines indicate roadways that have less demand. As noted above, demand can be used in connection with determining a value of information with respect to a particular segment of a phenomenon model (such as a traffic model).

Figure 11:
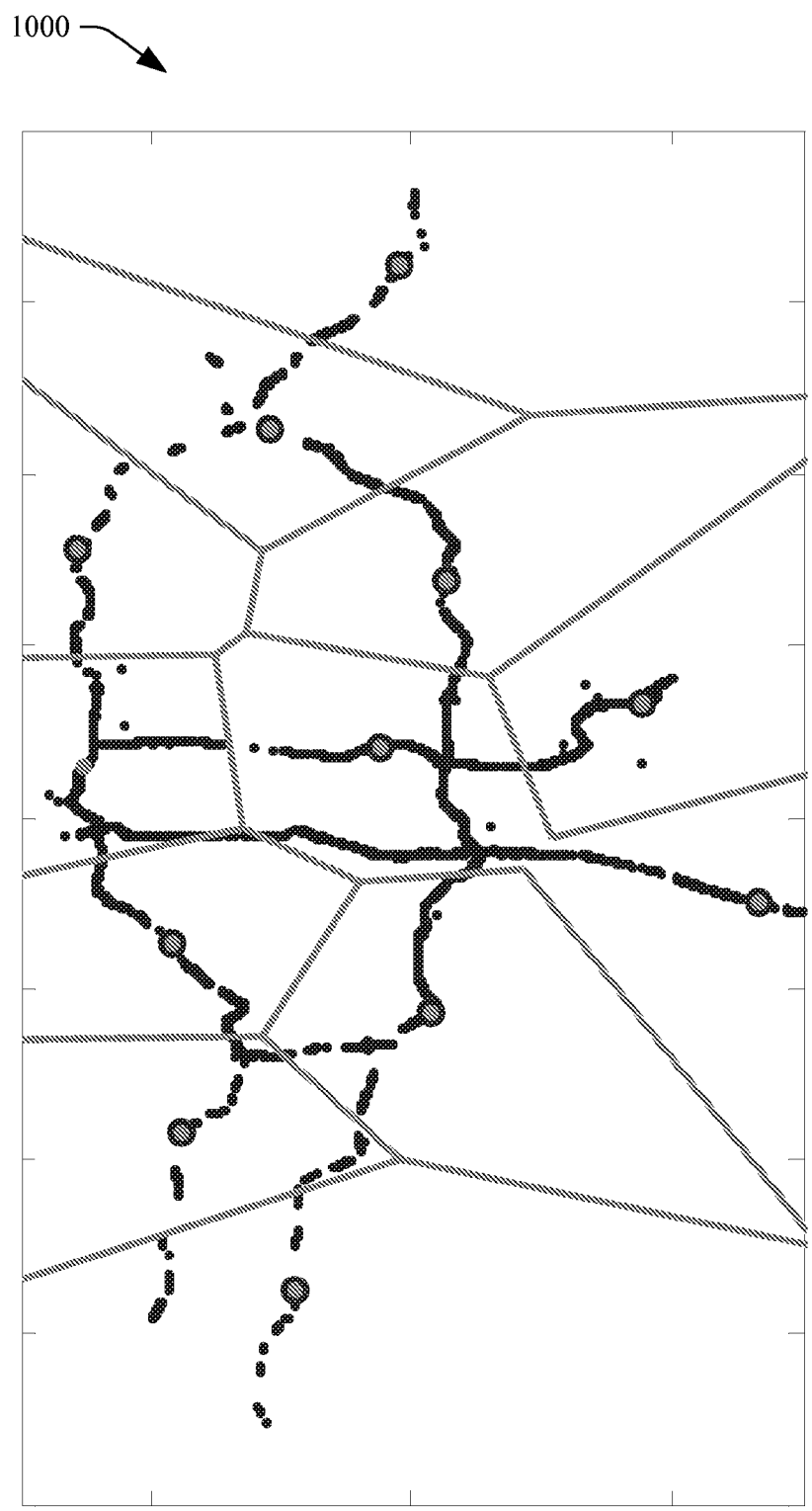
FIG. 11 is an exemplary graphical depiction of a traffic system partitioned into a plurality of regions.

Referring now to FIG. 11, an example graphical depiction 1100 of a traffic system that is partitioned into a plurality of regions. The regions can be used in connection with a spatial obfuscation approach as described above. For instance, knowledge relating to which region a sensor is in can be used to determine whether to specifically ping the sensor for a precise location and velocity. Such a technique can be used with respect to models other than traffic systems, such as lines at an airport or lines at an amusement park.

Figure 12:
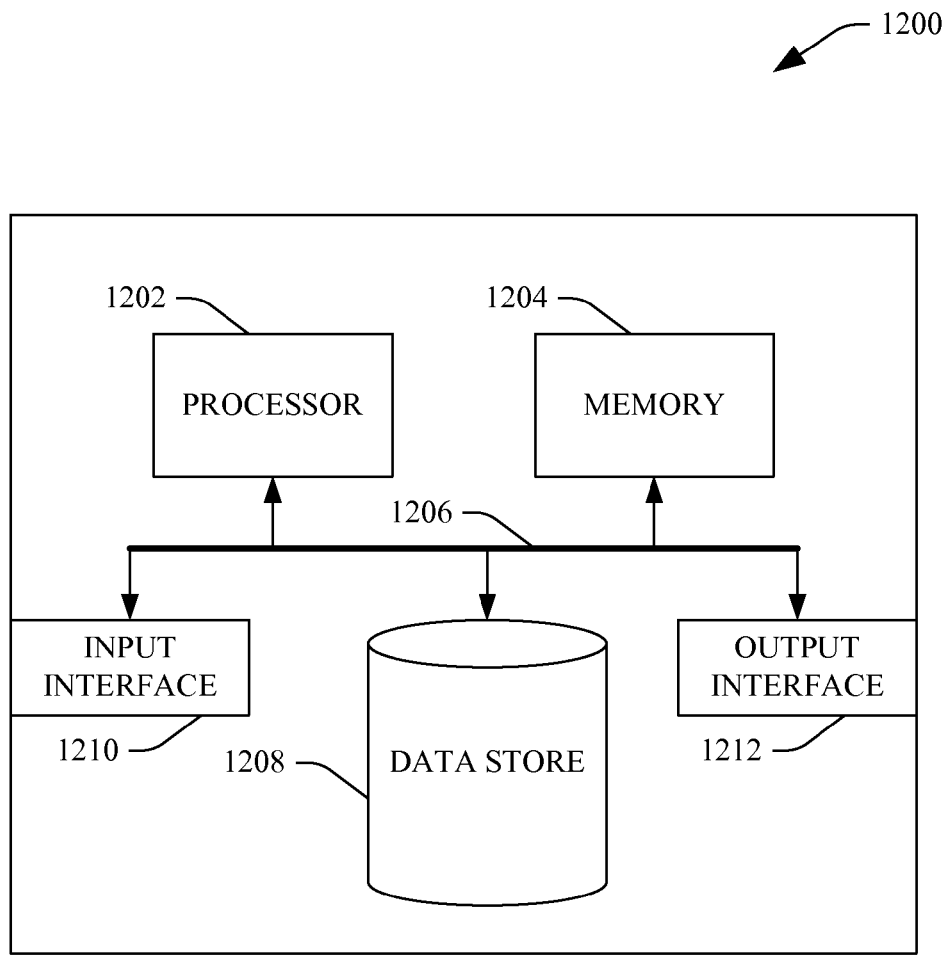
FIG. 12 is an exemplary computing system.

Now referring to FIG. 12, a high-level illustration of an example computing device 1200 that can be used in accordance with the systems and methodologies disclosed herein is illustrated. For instance, the computing device 1200 may be used in a system that supports depiction of traffic flows over a traffic system and/or prediction of traffic flows of a traffic system. The computing device 1200 may be or may be included in a server system, a client device, a portable device (such as a personal digital assistant). The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory by way of a system bus 1206. In addition to storing executable instructions, the memory 1204 may also store sensed data, demand information, etc.

The computing device 1200 additionally includes a data store 1208 that is accessible by the processor 1202 by way of the system bus 1206. The data store 1208 may include executable instructions, sensed information, a list of sensors, one or more models, etc. The computing device 1200 also includes an input interface 1210 that allows external devices or users to communicate with the computing device 1200. For instance, the input interface 1210 may be used to receive instructions from an external computer device, receive instructions from a user, etc. The computing device 1200 also includes an output interface 1212 that interfaces the computing device 1200 with one or more external devices. For example, the computing device 1200 may request data from sensors by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
   a processor; and
   a memory, wherein the memory comprises components that are executable by the processor, the components comprising:
     a receiver component that receives first data that is indicative of a value of information (VOI) for receiving second data from a computing device that corresponds to a user, wherein the second data is indicative of a current context of the user, and wherein the value of information indicates a desirability of a utilitarian computing application receiving the second data; and
     a selector component that selects the computing device from a plurality of other computing devices that respectively correspond to other users based at least in part upon the first data.

2. The system of claim 1, wherein the context of the user is a current location of the user.

3. The system of claim 2, wherein the utilitarian computing application is a traffic application, and wherein the VOI pertains to reducing an amount of uncertainty in a traffic system that corresponds to the traffic application.

4. The system of claim 1, wherein the receiver component additionally receives preferences regarding sharing data from the computing device for the user, wherein the selector component selects the computing device from amongst the plurality of computing devices based at least in part upon the preferences regarding sharing data from the computing device for the user.

5. The system of claim 1, wherein the VOI is demand-weighted.

6. The system of claim 1, further comprising:
   a requestor component that requests data from the computing device subsequent to the computing device being selected by the selector component; and
   an updater component that updates an output of the utilitarian computing application based at least in part upon data received from the computing device.

7. The system of claim 1, wherein the computing device comprises a GPS sensor, and wherein the VOI is indicative of a desirability of the utilitarian computing application receiving location data generated by the GPS sensor.

8. The system of claim 1, further comprising a service provider component that provides a computer-implemented service to the user in return for the user sharing data from the computing device.

9. A method executed by a processor of a computing device, the method comprising:
   receiving first data that is indicative of a value of information (V0I) for receiving second data from a computing device that corresponds to a user, wherein the second data is indicative of a current context of the user, and wherein the value of information indicates a desirability of a utilitarian computing application receiving the second data; and
   selecting the computing device from a plurality of other computing devices that respectively correspond to other users based at least in part upon the first data.

10. The method of claim 9, wherein the context of the user is a current location of the user.

11. The method of claim 10, wherein the utilitarian computing application is a traffic application, and wherein the VOI pertains to reducing an amount of uncertainty in a traffic system that corresponds to the traffic application.

12. The method of claim 9, further comprising:
    receiving preferences regarding sharing data from the computing device for the user, wherein the computing device is selected from amongst the plurality of computing devices based at least in part upon the preferences regarding sharing data from the computing device for the user.

13. The method of claim 9, wherein the VOI is demand-weighted.

14. The method of claim 9, further comprising:
    requesting data from the computing device subsequent to the computing device being selected; and
    updating an output of the utilitarian computing application based at least in part upon data received from the computing device.

15. The method of claim 9, wherein the computing device comprises a GPS sensor, and wherein the VOI is indicative of a desirability of the utilitarian computing application receiving location data generated by the GPS sensor.

16. The method of claim 9, further comprising:
    providing a computer-implemented service to the user in return for the user sharing data from the computing device.

17. A computer-readable data storage device comprising instructions that, when executed by a processor, cause the processor to perform acts comprising:
    receiving first data that is indicative of a value of information (VOI) for receiving second data from a computing device that corresponds to a user, wherein the second data is indicative of a current context of the user, and wherein the value of information indicates a desirability of a utilitarian computing application receiving the second data; and
    selecting the computing device from a plurality of other computing devices that respectively correspond to other users based at least in part upon the first data.

18. The computer-readable data storage device of claim 17, wherein the context of the user is a current location of the user.

19. The computer-readable data storage device of claim 18, wherein the utilitarian computing application is a traffic application, and wherein the VOI pertains to reducing an amount of uncertainty in a traffic system that corresponds to the traffic application.

* * * * *